US012145063B2

(12) United States Patent
Lewis

(10) Patent No.: US 12,145,063 B2
(45) Date of Patent: Nov. 19, 2024

(54) SYSTEM FOR PROVIDING DATA AND USER INTERFACES FOR A MULTI-ROUND MULTIPLAYER PREDICTION GAME

(71) Applicant: Jeffrey Lewis, New York, NY (US)

(72) Inventor: Jeffrey Lewis, New York, NY (US)

( * ) Notice: Subject to any disclaimer, the term of this patent is extended or adjusted under 35 U.S.C. 154(b) by 379 days.

(21) Appl. No.: 17/456,093

(22) Filed: Nov. 22, 2021

(65) Prior Publication Data

US 2022/0161135 A1 May 26, 2022

Related U.S. Application Data

(60) Provisional application No. 63/117,814, filed on Nov. 24, 2020.

(51) Int. Cl.
| | |
|---|---|
| *A63F 13/00* | (2014.01) |
| *A63F 13/533* | (2014.01) |
| *A63F 13/65* | (2014.01) |
| *G06F 3/0482* | (2013.01) |
| *G06T 11/00* | (2006.01) |
| *H04L 67/131* | (2022.01) |

(52) U.S. Cl.
CPC ............ *A63F 13/533* (2014.09); *A63F 13/65* (2014.09); *G06F 3/0482* (2013.01); *G06T 11/00* (2013.01); *H04L 67/131* (2022.05); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,287,199 B1* | 9/2001 | McKeown | ......... | H04N 7/17318 348/E7.071 |
| 8,545,311 B2* | 10/2013 | Shore | .................. | G07F 17/3288 463/40 |
| 8,858,313 B1* | 10/2014 | Selfors | .................... | A63F 13/65 463/43 |
| 2006/0199631 A1* | 9/2006 | McGill | .................. | G07F 17/32 463/16 |
| 2007/0197247 A1* | 8/2007 | Inselberg | ............... | G06Q 30/02 455/517 |
| 2011/0195791 A1* | 8/2011 | Walker | .................. | G06Q 10/02 463/16 |

(Continued)

*Primary Examiner* — Paul A D'Agostino
(74) *Attorney, Agent, or Firm* — Morrison & Foerster LLP

(57) ABSTRACT

A network-enabled system for receiving prediction data, augmenting prediction data, evaluating prediction data, and providing various user interfaces is provided. The system may provide user interfaces to network-enabled user devices enabling end users to indicate predictions regarding live events. The system may augment user prediction data with time data that is agnostic to one or more timing conventions associated with the underlying live event about which predictions are made. User predictions may then be evaluated on the basis of the augmented data according to the time standard that is agnostic to the in-event timing conventions. User interfaces may be updated in accordance with evaluation of user's predictions, such that subsequent predictions may be solicited from user devices that have submitted accurate predictions. Users may be prompted to submit conditional predictions for future time periods in advance of previous/current predictions being evaluated.

27 Claims, 7 Drawing Sheets

(56) References Cited

U.S. PATENT DOCUMENTS

| | | | |
|---|---|---|---|
| 2013/0079094 A1* | 3/2013 | Odom | G07F 17/32 463/25 |
| 2013/0116032 A1* | 5/2013 | Lutnick | G07F 17/32 463/25 |
| 2013/0324228 A1* | 12/2013 | Barber | G07F 17/3276 463/25 |
| 2014/0018156 A1* | 1/2014 | Rizzotti | G07F 17/3276 463/31 |
| 2014/0058545 A1* | 2/2014 | Lee | A63F 13/798 700/91 |
| 2014/0066159 A1* | 3/2014 | Odom | G07F 17/329 463/17 |
| 2014/0067500 A1* | 3/2014 | Heineman | G06Q 30/02 705/14.1 |
| 2014/0302918 A1* | 10/2014 | Minitzer | G07F 17/3288 463/26 |
| 2015/0379816 A1* | 12/2015 | Hayon | G07F 17/32 463/25 |
| 2016/0110659 A1* | 4/2016 | Skeen | H04N 21/4826 705/5 |
| 2016/0133088 A1* | 5/2016 | Givant | G07F 17/3288 463/25 |
| 2016/0275752 A1* | 9/2016 | Rosenbaum | G06Q 50/34 |
| 2016/0300430 A1* | 10/2016 | Ortiz | G07F 17/326 |
| 2016/0300432 A1* | 10/2016 | Devaraj | G07F 17/3225 |
| 2016/0300433 A1* | 10/2016 | Ortiz | G07F 17/32 |
| 2016/0300440 A1* | 10/2016 | Ortiz | G07F 17/326 |
| 2016/0372087 A1* | 12/2016 | Khinchuk | G06F 3/04847 |
| 2017/0084108 A1* | 3/2017 | Smith | G07F 17/3237 |
| 2017/0106293 A1* | 4/2017 | Johnson | G07F 17/3288 |
| 2017/0140605 A1* | 5/2017 | Lewski | G07F 17/3288 |
| 2017/0236364 A1* | 8/2017 | Heathcote | G07F 17/329 463/20 |
| 2017/0238055 A1* | 8/2017 | Chang | H04N 21/4345 725/19 |
| 2018/0015374 A1* | 1/2018 | Kehoe | A63F 13/795 |
| 2018/0061173 A1* | 3/2018 | Khosla | G07F 17/3211 |
| 2018/0204417 A1* | 7/2018 | Triplett | G07F 17/3276 |

\* cited by examiner

SYSTEM FOR PROVIDING DATA AND USER INTERFACES FOR A MULTI-ROUND MULTIPLAYER PREDICTION GAME

CROSS REFERENCE TO RELATED APPLICATIONS

This application claims the priority of U.S. Provisional Application No. 63/117,814, filed Nov. 24, 2020, the entire contents of which is incorporated herein by reference.

FIELD

This disclosure relates generally to gaming systems, and more particularly to systems, methods, and user interfaces for providing a facilitating a multi-round survivor game in which participants make predictions about live events.

BACKGROUND

A gaming system may solicit predictions from a user regarding an unknown future event, such as regarding one or more outcomes in a sporting event or other live event. At a later time, it may then be determined whether the user's prediction regarding the outcome was correct, and one or more automatic responses in the gaming system may be triggered accordingly, such as updating one or more user interface screens provided to the user in accordance with whether their prediction is determined to have been correct.

SUMMARY

As explained above, gaming systems may solicit predictions from users regarding outcomes of future events, and automatic responses in the gaming system may be triggered in response to a subsequent determination, based on data received regarding the event, as to whether a user's prediction was correct. In some systems, a user may make a prediction regarding an outcome of a sporting event. A gaming system may then receive data regarding the outcome of the sporting event once the sporting event has concluded, and the user's prediction may be evaluated; if the user's prediction was correct, then the user may be rewarded in the system with one or more favorable in-game outcomes, including the opportunity to continue to participate in the game. In some embodiments, a gaming system may implement multiple rounds in which users make predictions regarding outcomes, and only those users whose predictions are correct are advanced by the system to subsequent rounds. For example, users may predict the outcomes of games on a given week, and those users whose predictions for one week are correct may advance to the next week.

However, known gaming systems suffer from multiple drawbacks, including that they are bound by unpredictable timing schemes of live events (e.g., sporting events) that are often unstandardized and slow moving. It may be difficult or impossible to predict exactly when a sporting event will start and, to an even greater degree, when it will end. Thus, assessing the outcome of a user's prediction often requires that a prediction be made well in advance and that a user wait several hours at least—for an amount of time that cannot be precisely predicted in advance—for their prediction to be assessed once the live event has concluded. Because of the slow-moving nature (and unpredictable timing schemes) of live events such as sporting events, existing systems are ill-suited for massively multiplayer elimination style prediction games in which a large number of participants are eliminated over a series of subsequent rounds. Survivor games with a large number (e.g., hundreds or thousands) of participants may thus take days, weeks, or even months to eliminate a majority or a substantial majority of participants. Accordingly, participation in said games is discouraged and engagement with gaming systems is limited. Thus, there is a need for improved gaming systems that have predictable and fast-moving timing schemes for assessing a large number of users' predictions in a quick and predictable manner, thereby facilitating massively-multiplayer participation in quick-moving elimination style games.

Disclosed herein are systems, methods, and user interfaces for facilitating a multi-round multiplayer survivor game that may address one or more of the above-identified needs. In some embodiments, a large number of participants are each able to make successive predictions about outcomes of a live event, such as a sporting event, in a series of rounds. Users who make an incorrect prediction in a rounds are eliminated from contention in future rounds.

Unlike slow-moving survivor prediction games, the disclosure herein provides for a rapid-fire game that may quickly reduce a pool of hundreds of thousands or millions of participants to a small number of winners, such as under 100 winners or under 10 winners, in a relatively short period of time, such as within the span of a single sporting event. In some embodiments, rapid elimination of large numbers of participants, facilitating massively-multiplayer participation, may be aided by the following two principles.

First, the chronological bounds of rounds in the game may be agnostic to in-game time-standards, allowing for rapid-fire rounds to be defined with respect to a global time-standard—e.g., Coordinated Universal Time—rather than being defined with respect to an unpredictable game-clock (and/or unpredictable game structures such as innings, rounds, holes, etc.) governing rules of the game about which predictions are being made. For example, by defining the chronological bounds of rounds with respect to a global time-standard, rapid-fire rounds may be set to be exactly 1-minute, 2-minutes, or 5-minutes in length. This may allow for deterministic starting and ending times for rounds and for an overall elimination game, encouraging user participation at predefined times and allowing for rapid elimination of large numbers of users over successive rapid-fire rounds, regardless of whether delays occur in the timing standards of the underlying live event.

Second, sequential rounds in the game may be directly adjacent in time to one another, such that the end of one round coincides with the beginning of the next round. With no "down-time" between rounds, elimination of the largest number of participants via the largest number of rounds in a given time-frame may be achieved. In order to facilitate sequential rounds directly abutting one another in time, users may be required to submit one or more predictions for one or more forthcoming rounds before the forthcoming round begins and before a current round ends. Thus, users' predictions made for forthcoming rounds may be contingent on the user's prediction in the current round being correct (e.g., contingent on the user advancing to the future round for which the contingent prediction is made).

In some embodiments, a first system is provided, the first system comprising one or more processors configured to: provide first instructions to a network-connected user device for displaying a graphical user interface on a display of the mobile electronic device, wherein the graphical user interface comprises a first user interface object configured to accept one or more inputs indicating predictions regarding live events; receive, from the user device, user input data specifying a prediction regarding a live event; receive event data regarding the live event, wherein the event data comprises first time data indicating a time, according to a game-clock time-standard, at which an occurrence associated with the live event occurred; generate augmented data by associating the event data with second time data, wherein the second time-data indicates the point in time, according to a second time-standard different from the game-clock time-standard, at which the occurrence associated with the live event occurred; determine whether the prediction is correct based at least in part on the user input data and the augmented data comprising the second time data; and provide second instructions to the user device for updating the graphical user interface in accordance with the determination as to whether the prediction was correct, wherein updating the user graphical interface comprises displaying an indication indicating whether the prediction was correct.

In some embodiments of the first system, the prediction regarding a live event comprises a prediction as to whether the occurrence would will occur during a predetermined chronological portion of the live event, wherein the predetermined chronological portion of the live event is defined with respect to the second time standard.

In some embodiments of the first system, displaying the indication indicating whether the prediction was correct comprises, in accordance with a determination that the prediction was correct, displaying a second user interface object configured to accept one or more inputs indicating predictions regarding live events, wherein: the first user interface object is configured to accept one or more predictions regarding a first chronological portion of the live event; and the second user interface object is configured to accept inputs pertaining to a second chronological portion of the live event, wherein the second chronological portion is subsequent to the first chronological portion.

In some embodiments of the first system, displaying the indication indicating whether the prediction was correct comprises, in accordance with determining that the prediction was not correct, not displaying the second user interface object.

In some embodiments of the first system, displaying the indication indicating whether the prediction was correct comprises, in accordance with a determination that the prediction was not correct, displaying an indication that a user has been eliminated from contention in a multi-round game.

In some embodiments of the first system, the live event comprises a sporting event, and the occurrence associated with the live event comprises a statistic being performed by a participant in the sporting event.

In some embodiments of the first system, displaying the graphical user interface comprises displaying a video feed of the live event.

In some embodiments of the first system, the occurrence associated with the live event comprises broadcasting, via the video feed, of an in-event occurrence of the live event.

In some embodiments of the first system, displaying the graphical user interface comprises displaying a live indication of the second time-standard.

In some embodiments of the first system, the second time-standard different from the game-clock time-standard comprises a time standard selected from: UT0, UT1, UT1R, UT2, and UTC.

In some embodiments of the first system, displaying an indication indicating whether the prediction was correct comprises, in accordance with a determination that the prediction was correct, displaying a second user interface object configured to accept one or more inputs indicating predictions regarding live events.

In some embodiments, a first non-transitory computer-readable storage medium is provided, the first non-transitory computer-readable storage medium storing instructions that, when executed by one or more processors of a network-enabled gaming system, cause the system to: provide first instructions to a network-connected user device for displaying a graphical user interface on a display of the mobile electronic device, wherein the graphical user interface comprises a first user interface object configured to accept one or more inputs indicating predictions regarding live events; receive, from the user device, user input data specifying a prediction regarding a live event; receive event data regarding the live event, wherein the event data comprises first time data indicating a time, according to a game-clock time-standard, at which an occurrence associated with the live event occurred; generate augmented data by associating the event data with second time data, wherein the second time-data indicates the point in time, according to a second time-standard different from the game-clock time-standard, at which the occurrence associated with the live event occurred; determine whether the prediction is correct based at least in part on the user input data and the augmented data comprising the second time data; and provide second instructions to the user device for updating the graphical user interface in accordance with the determination as to whether the prediction was correct, wherein updating the user graphical interface comprises displaying an indication indicating whether the prediction was correct.

In some embodiments, a first method is provided, the first method performed by one or more processors of a network-enabled gaming system, the first method comprising: providing first instructions to a network-connected user device for displaying a graphical user interface on a display of the mobile electronic device, wherein the graphical user interface comprises a first user interface object configured to accept one or more inputs indicating predictions regarding live events; receiving, from the user device, user input data specifying a prediction regarding a live event; receiving event data regarding the live event, wherein the event data comprises first time data indicating a time, according to a game-clock time-standard, at which an occurrence associated with the live event occurred; generating augmented data by associating the event data with second time data, wherein the second time-data indicates the point in time, according to a second time-standard different from the game-clock time-standard, at which the occurrence associated with the live event occurred; determining whether the prediction is correct based at least in part on the user input data and the augmented data comprising the second time data; and providing second instructions to the user device for updating the graphical user interface in accordance with the determination as to whether the prediction was correct, wherein updating the user graphical interface comprises displaying an indication indicating whether the prediction was correct.

In some embodiments, a second system is provided, the second system comprising one or more processors configured to: receive event data regarding a live event, wherein the event data comprises first time data indicating a time, according to a game-clock time-standard, at which an occurrence associated with the live event occurred; generate augmented data by associating the input data with second time data, wherein the second time-data indicates the point in time, according to a second time-standard different from the game-clock time-standard, at which the occurrence associated with the live event occurred; and store the augmented data comprising the second time data in a database.

In some embodiments of the second system, the live event comprises a sporting event, and the occurrence associated with the live event comprises a statistic being performed by a participant in the sporting event.

In some embodiments of the second system, the occurrence associated with the live event comprises broadcasting of an in-event occurrence of the live event.

In some embodiments of the second system, the second time-standard different from the game-clock time-standard comprises a time standard selected from: UT0, UT1, UT1R, UT2, and UTC.

In some embodiments, a second non-transitory computer-readable storage medium is provided, the second non-transitory computer-readable storage medium storing instructions that, when executed by one or more processors of a data ingestion system for receiving and augmenting live event data, cause the system to: receive event data regarding a live event, wherein the event data comprises first time data indicating a time, according to a game-clock time-standard, at which an occurrence associated with the live event occurred; generate augmented data by associating the input data with second time data, wherein the second time-data indicates the point in time, according to a second time-standard different from the game-clock time-standard, at which the occurrence associated with the live event occurred; and store the augmented data comprising the second time data in a database.

In some embodiments, a second method is provided the second method performed by data ingestion system for receiving and augmenting live event data, the second method comprising: receiving event data regarding a live event, wherein the event data comprises first time data indicating a time, according to a game-clock time-standard, at which an occurrence associated with the live event occurred; generating augmented data by associating the input data with second time data, wherein the second time-data indicates the point in time, according to a second time-standard different from the game-clock time-standard, at which the occurrence associated with the live event occurred; and storing the augmented data comprising the second time data in a database.

In some embodiments, a third system is provided, the third system comprising one or more processors configured to: during a first period of time: provide first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and receive first user input data indicating a first set of respective predictions from the set of user devices, wherein the first set of predictions pertains to the second period of time and to the live event; during the second period of time: provide second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time; receive second user input data indicating a second set of respective predictions from the set of user devices, wherein the second set of predictions pertains to the third period of time and to the live event; receive event data regarding the live event, wherein the event data comprises an indication of an occurrence associated with the live event that occurred during the second period of time; and after receiving at least one of the predictions of the second set of predictions, determine whether each prediction of the first set of predictions was correct, wherein the determination is based at least in part on the event data and the first user input data; and during the third period of time: provide third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

In some embodiments of the third system, the first subset comprises user devices of the set of user devices for which a respective prediction from the first set of predictions was determined to be correct.

In some embodiments of the third system, the one or more processors are further configured to, during the third period of time, provide fourth instructions to a second subset of the set of network-connected user devices for displaying, during the third period of time, via the graphical user interface, an indication that a prediction associated with the respective user device regarding the second period of time was incorrect.

In some embodiments of the third system, the second subset comprises user devices of the set of user devices for which a respective prediction from the first set of predictions was determined to be incorrect.

In some embodiments of the third system, the second period of time is defined with respect to a time standard selected from: UT0, UT1, UT1R, UT2, and UTC.

In some embodiments of the third system: the event data comprises first time data defined with respect to a game-clock time standard associated with the live event; and determining whether each prediction of the first set of predictions was correct comprises augmenting the event data with second time data defined with respect to a second time standard different from the game-clock time-standard.

In some embodiments, a third non-transitory computer-readable storage medium is provided, the third non-transitory computer-readable storage medium storing instructions that, when executed by one or more processors of a network-enabled gaming system, cause the system to: during a first period of time: provide first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and receive first user input data indicating a first set of respective predictions from the set of user devices, wherein the first set of predictions pertains to the second period of time and to the live event; during the second period of time: provide second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time; receive second user input data indicating a second set of respective predictions from the set of user devices, wherein the second set of predictions pertains to the third period of time and to the live event; receive event data regarding the live event, wherein the event data comprises an indication of an occurrence associated with the live event that occurred during the second period of time; and after receiving at least one of the predictions of the second set of predictions, determine whether each prediction of the first set of predictions was correct, wherein the determination is based at least in part on the event data and the first user input data; and during the third period of time: provide third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

In some embodiments, a third method is provided, the third method performed by a network-enabled gaming system comprising one or more processors, the third method comprising: during a first period of time: providing first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and receiving first user input data indicating a first set of respective predictions from the set of user devices, wherein the first set of predictions pertains to the second period of time and to the live event; during the second period of time: providing second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time; receiving second user input data indicating a second set of respective predictions from the set of user devices, wherein the second set of predictions pertains to the third period of time and to the live event; receiving event data regarding the live event, wherein the event data comprises an indication of an occurrence associated with the live event that occurred during the second period of time; and after receiving at least one of the predictions of the second set of predictions, determining whether each prediction of the first set of predictions was correct, wherein the determination is based at least in part on the event data and the first user input data; and during the third period of time: providing third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

In some embodiments, any one or more features or aspects of any one or more of the methods, systems, and/or computer-readable storage media disclosed herein may be combined, in whole or in part, with one another and/or with any other features or aspects disclosed elsewhere herein.

BRIEF DESCRIPTION OF THE FIGURES

The foregoing summary, as well as the following detailed description of embodiments, is better understood when read in conjunction with the appended drawings. For the purpose of illustrating the present disclosure, the drawings show exemplary embodiments of the disclosure; the disclosure, however, is not limited to the specific methods and instrumentalities disclosed. In the drawings.

DETAILED DESCRIPTION

Disclosed herein are systems, methods, and user interfaces for facilitating a multi-round survivor prediction game in which a large number of participants are each able to make successive predictions about outcomes of a live event, such as a sporting event, in a series of rounds. Users who make an incorrect prediction in a rounds are eliminated from contention in future rounds. As explained below in detail, event data regarding outcomes of live events may be augmented with time data according to a coordinated or universal time-standard used in making and the in-game assessing predictions. Furthermore, as explained below in detail, rounds of the game may directly abut one another in time, such that users may make conditional predictions for future rounds before the outcomes of a current round are determined. By leveraging the principles disclosed herein, a system may be able to provide a massively-multiplayer network-enabled multi-round survivor game in which hundreds of thousands or even millions of participants may be rapidly whittled down to fewer than 100, fewer than ten, or a single winner in the course of hours, or even less than one hour, during a single sporting event or other live event.

Figure 1:
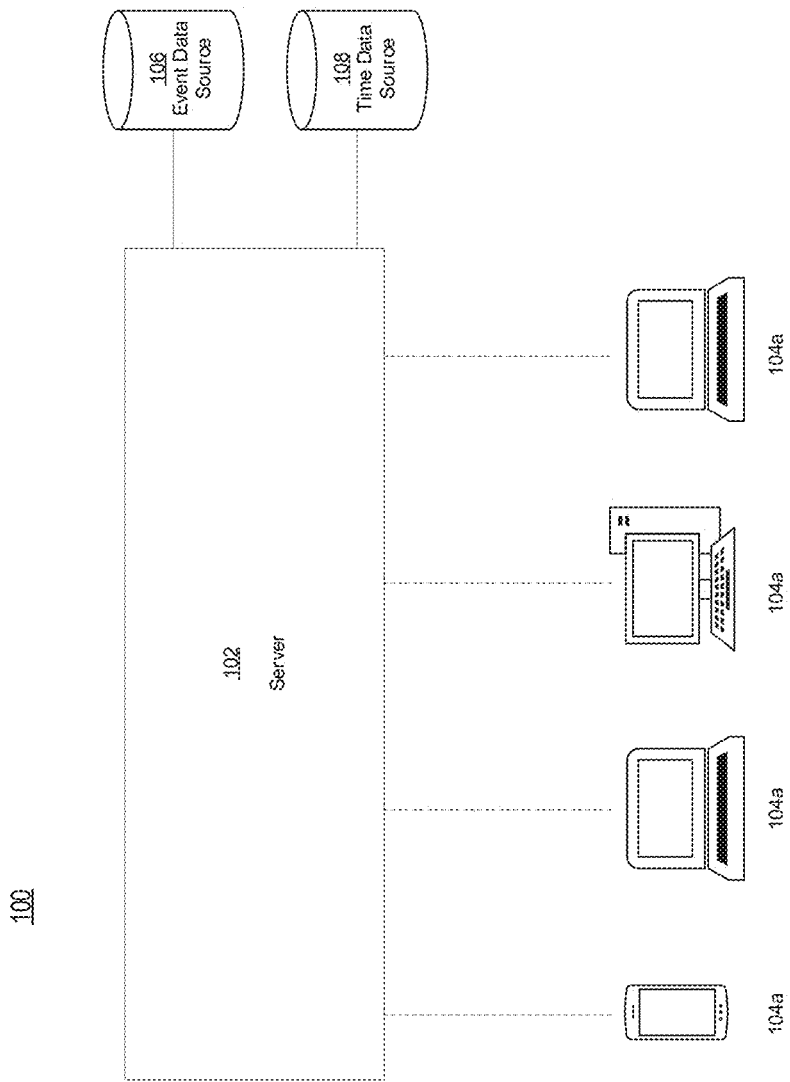
FIG. 1 shows a network gaming system, in accordance with some embodiments.

FIG. 1 shows a network gaming system 100, in accordance with some embodiments. As shown in FIG. 1, system 100 may include server 102, user devices 104a-104d, event data source 106, and time data source 108. In some embodiments, server 102 comprises one or more processors configured to execute instructions to cause the server to receive data, to process data, and to transmit data in order to provide a gaming platform to one or more user devices such as user devices 104a-104d. In some embodiments, the functionality described herein as provided by server 102 may be provided by any suitable computer processor, an plurality of computer processors, any suitable server, a plurality of servers, a distributed computing system, and/or a cloud computing system.

In some embodiments, server 102 may be communicatively coupled with one or more user devices 104a-104d and configured to send and receive data, via wired and/or wireless network communication, to and from each of the user devices. In some embodiments, a user device 102 may be any suitable electronic device configured to receive instructions from server 102 to display a graphical user interface to a user, to detect user inputs from the user, and to transmit data to server 102 regarding detected user inputs.

In some embodiments, a user device 102 may include one or more of a personal computer, a laptop, a smart phone, a tablet, a mobile electronic device, a wearable device, a workstation, or the like.

In some embodiments, system 100 may include a single user device or any number of multiple user devices. In some embodiments, system 100 may include a large number of user devices participating in a massively-multiplayer game; for example, system 100 may include more than 1000 user devices, more than 10,000 user devices, more than 100,000 user devices, or more than 1,000,000 user devices.

In some embodiments, server 102 may be communicatively coupled with event data source 106 and configured to send and receive data, via wired and/or wireless network communication, to and from event data source 106. In some embodiments, event data source 106 may be any suitable data store, computer, computer system, and/or information feed configured to transmit event data to server 102 regarding one or more live events.

In some embodiments, the event data may indicate any information regarding occurrences in the live events—e.g., winners, losers, points scored, or any other statistical information regarding outcomes of a sporting event or other live event (e.g., game show, reality television show, competition, election, race, match, tournament, stock market, trading market etc.).

In some embodiments, the event data received may indicate timing information associated with the information regarding outcomes; for example, timing information received as part of the event data may indicate a time at which one or more occurrences in the live event occurred. In some embodiments, the timing information included in the event data may be defined with respect to an in-event time standard such as a game-clock or other timing scheme used for the sporting event or live event. For example, the timing information included in the event data may indicate a game-clock time at which a statistic was recorded; a half, quarter, or period of a sporting event in which a statistic was recorded; a round, heat, or inning of a sporting event in which an event was recorded; etc. In some embodiments, the timing information may be associated with the information regarding in-game occurrences as metadata included in the event data.

In some embodiments, system 100 may include a single event data source or any number of multiple event data sources. In some embodiments, system 100 may include multiple event data sources corresponding to different live events and/or to different sets of live events, such that system 100 may ingest event data regarding a large number of live events at once.

In some embodiments, server 102 may be communicatively coupled with time data source 108 and configured to send and receive data, via wired and/or wireless network communication, to and from time data source 108. In some embodiments, time data source 108 may be any suitable data store, computer, computer system, clock system, and/or information feed configured to transmit time data to server 102.

In some embodiments, the time data received from time data source 108 may be distinct from time information included in event data received from event data source 106. In some embodiments, time data received from time data source 108 may be time data according to one or more time standards, such as a coordinated time standard such as UT0, UT1, UT1R, UT2, or UTC. Thus, time information included in event data may include time information according to a an in-event time standard such as a game-clock, while time data received from time data source 108 may include time information according to a second time-standard different from the in-event time standard. In some embodiments, as discussed below in further detail, system 100 may be configured to augment the event data received from event data source 106 by storing it in association with time data received from time data source 108, thereby creating augmented event data that associates in-event occurrences with the time standard of the time data, rather than the event data merely being associated only with in-event time data such as game-clock time data.

In some embodiments, system 100 may include a single time data source or any number of multiple time data sources. In some embodiments, system 100 may include multiple time data sources corresponding to different time standards and/or to different sets of time standards, such that system 100 may ingest time data regarding several different time standards and optionally augment event data with time data regarding several different time standards.

In some embodiments, users of devices 104a-104d may be participants in a multiplayer game provided by system 100. Server 102 may provide instructions to a user device 104 to display a graphical user interface (e.g., see FIG. 2) that includes one or more user interface objects by which a user may indicate a prediction about a live event. For example, a user may use one or more dropdown menus, input fields, check-boxes, toggle switches, or the like to execute an input via a displayed user interface on device 104 in order to execute a prediction about a live event. Data regarding the user's prediction may be transmitted from the user device 104 to server 102 and may be stored by server 102 in any suitable local or remote storage for future assessment by server 102.

Following receipt and/or storage of user's prediction data, server 102 may receive event data from event data source 106 and may use said event data to assess whether users' predictions were correct. In accordance with determining whether a user's prediction was correct, instructions may be sent by server 102 to the corresponding user's user device (104) to update the user interface displayed thereon. In some embodiments, the user interface may be updated to display an indication as to whether the user's prediction was determined to be correct or incorrect. In some embodiments, in accordance with the user's prediction being determined to be correct, the user interface may be updated to display an indication that the user has advanced to a subsequent round of a multi-round prediction game; in some embodiments, the user interface may accordingly display one or more graphical user interface objects configured to accept user inputs for indicating predictions for a future round of the multi-round prediction game. In some embodiments, in accordance with the user's prediction being determined to be correct, the user interface may be updated to display an indication that the user has not advanced to a subsequent round of a multi-round prediction game.

In some embodiments, user predictions received and asses by system 100 may include a prediction as to whether (or how, or the extent to which) one or more occurrences will occur during a predefined window of time. In some embodiments, the predefined window of time may be defined with respect to an in-event timing standard, such as a game-clock. For example, a user may predict a number of points that are scored in a first quarter of a basketball game, wherein the time window to which the prediction applies is the first 15 minutes of the basketball game according to the game-clock of the basketball game.

In some embodiments, the predefined window of time may be defined with respect to a time standard different from an in-event time standard, e.g., different from a game-clock of a sporting event. In some embodiments, for example, a user may indicate a prediction as to a number of points that will be scored in a basketball game between 7:00 ET and 7:04 ET, irrespective of the in-event game-clock. In some embodiments, predictions based on time standards different from an in-event game clock may, as discussed elsewhere herein, facilitate rapid elimination of a large number of users and to thereby allow for massively-multiplayer games that can be completed in a short amount of time.

In order to facilitate assessment predictions that are made with respect to a predefined window of time may be defined with respect to a time standard different from an in-event time standard, system 100 may be configured to leverage time data received from time data source 108 to augment the event data received from event data source 106. System 100 may augmenting the event data to indicate when occurrences in the live event occurred according to a time standard (e.g., a coordinated time standard) of the time data.

In some embodiments, augmented data may be stored and may optionally be organized into one or more databases, storage schema, and/or data structures based at least in part on the time data with which the event data is augmented; for example, event data may be organized or sorted chronologically according to the time data indicating the non-game-clock time standard. In some embodiments, storing event data in accordance with non-game-clock time data may be more efficient from a storage standpoint; in some embodiments, storing event data in accordance with non-game-clock time data may facilitate faster data lookups and/or may be more computationally efficient.

Thus, system 100 may thus be able to solicit predictions from users that are made with respect to by the time standard of the time data, and system 100 may thereafter assess whether those user predictions were correct based on the augmented event data including the indication of when in-event occurrences occurred according to the non-game-clock time standard.

By defining time windows for soliciting and assessing predictions with respect to a coordinated and predictable system time standard, system 100 may facilitate ease of use and predictability of performance for massively-multiplayer multi-round prediction games. For example, system 100 may increase speed, predictability, usability, and consistency of the system. Unpredictability of the length of rounds in the game and/or downtime in the game may be avoided by allowing users to know with certainty that rounds will begin and end at a predetermined time according to system time or universal time, rather than leaving users to speculate when an in-event timing convention will dictate the end of a round.

Figure 2:
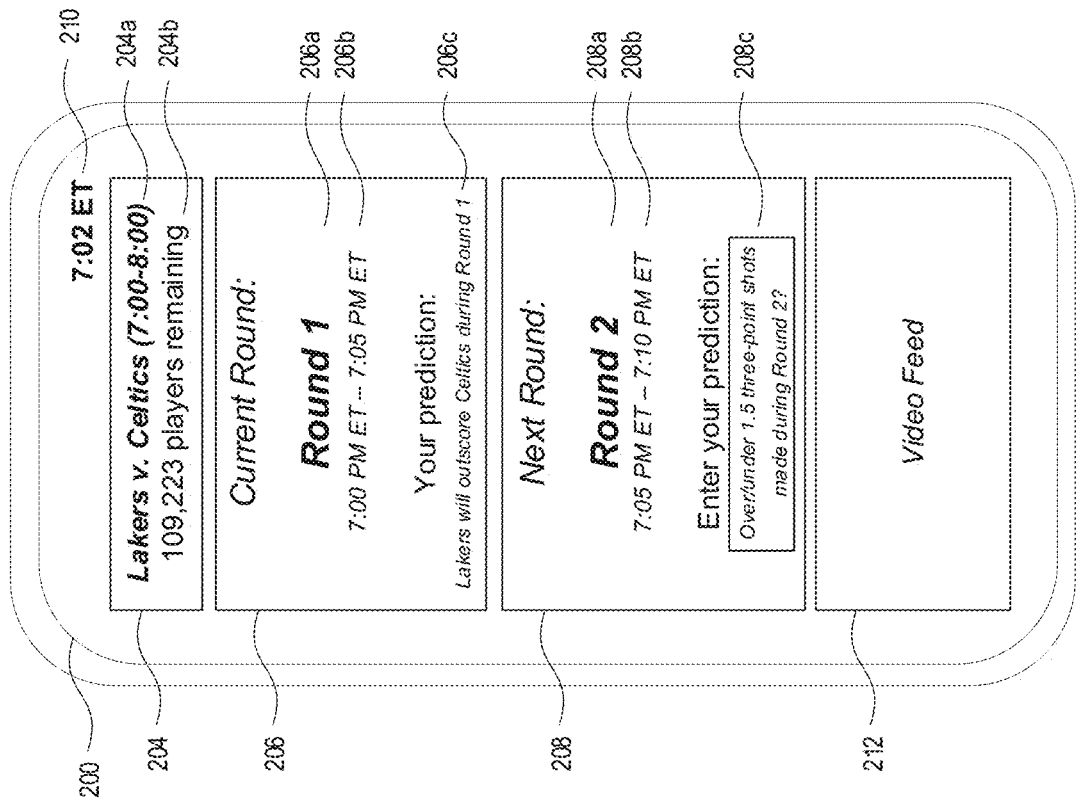
FIG. 2 shows a graphical user interface for a gaming system, in accordance with some embodiments.

FIG. 2 shows a graphical user interface 200 for a gaming system, in accordance with some embodiments. In some embodiments, graphical user interface may be provided on a user device of a gaming system, such as on user device 104a of system 100 described above with reference to FIG. 1. GUI 200 may be a graphical user interface of a multi-round multiplayer prediction game, wherein GUI 200 is configured to display information about the prediction game in which the user is participating, display information about a current round of the prediction game, display information about a future round of the prediction game, enable the user to execute inputs indicating a prediction for the future round of the prediction game, display information about the underlying live event about which predictions for the prediction game are being made, and display an indication of a time according to a time standard used to govern the prediction game. As shown, GUI 200 includes prediction game information region 204, current round information region 206, next round information region 208, time indicator 210, and video feed region 212.

In some embodiments, prediction game information region 204 may be a region of GUI 200 configured to display information about a prediction game to the user.

The information indicated in region 204 may include a name of the prediction game indicated by name information 204a. In the example shown, the name of the prediction game is "Lakers v. Celtics (7:00-8:00)" indicating that the prediction game runs from 7:00-8:00 ET and that the underlying live event on which the prediction game is based is a basketball game between the Lakers and Celtics. Notably, the system may allow users to elect to join more than one prediction game corresponding to single underlying event, so the specification that this particular prediction game is the game beginning at 7:00 may be necessary for users to distinguish it from other prediction games (e.g., another prediction game based on predictions about the same basketball game may run from 7:15-8:15 or from 7:30-8:00).

The information indicated in region 204 may include an indication of the number of players currently participating in the prediction game indicated by remaining players indicator 204b. In the example shown, there are over 109,000 users remaining in the prediction game, which is currently in Round 1 as discussed below. As participants in the prediction game are eliminated (e.g., in accordance with one or more predictions being determined to be incorrect), the indication of the number of remaining players may be updated accordingly and displayed to all participating users in the prediction game.

In some embodiments, current round information region 206 may be a region of GUI 200 configured to display information regarding a current round of the prediction game, including round identification information, starting time information, ending time information, time remaining information, and/or user prediction information.

The information included in region 206 may include an identification of the current round, as indicated by round ID 206a. In the example shown, the current round is identified by the name "Round 1."

The information included in region 206 may include an indication of time information for a current round, which may include start time, end time, and/or time remaining. In some embodiments, timing information for a round may be defined with respect to an in-event timing convention (e.g., a game clock, such that a round could be defined to last the first five minutes of game-clock of a basketball game), with respect to a time standard agnostic to in-event timing conventions (e.g., a coordinated universal time standard, such that a round could be defined to span from 7:00 ET to 7:04 ET), or with respect to both an in-event timing convention and a time standard agnostic to in-event timing conventions (e.g., such that a round could be defined as starting at tipoff and ending at 7:04 ET, or starting at 8:00 ET and ending at half-time). Current round timing information may be indicated by current round timing indicator 206b. In the example shown, the current round is indicated as starting at 7:00 PM ET and ending at 7:04 PM ET.

The information included in region 206 may include an indication of a prediction made by the user for the current round, as indicated by current round prediction indicator 206c. The prediction displayed may be "locked in" such that a user cannot update or change the prediction for the current round. In some embodiments, indicator 206c may textually or graphically indicate what the user's prediction was. In some embodiments, 206c may indicate an estimation of the likelihood that a user's prediction will be correct, for example a dynamically-updated estimation of the likelihood that the prediction will be correct calculated based on dynamically-updated event data from the live event. In the example shown, indicator 206c textually indicates that the user has predicted "Lakers will outscore Celtics during Round 1."

In some embodiments, next round information region 208 may be a region of GUI 200 configured to display information regarding a next upcoming round of the prediction game, and configured to accept one or more user inputs specifying a user prediction for the next upcoming round. In some embodiments, the information displayed by next round information region 208 may include round identification information, starting time information, ending time information, time remaining information, and/or user prediction information (if already made).

The information included in region 208 may include an identification of the next round, as indicated by round ID 208a. In the example shown, the next round is identified by the name "Round 2."

The information included in region 208 may include an indication of time information for a next round, which may include start time, end time, and/or time remaining until the next round begins. In some embodiments, timing information for a round may be defined with respect to an in-event timing convention, with respect to a time standard agnostic to in-event timing conventions, or with respect to both. Next round timing information may be indicated by next round timing indicator 208b. In the example shown, the next round is indicated as starting at 7:04 PM ET and ending at 7:08 PM ET.

Region 206 may additionally include a prediction input GUI object 208c configured to allow a user to input information regarding a prediction for the next upcoming round. In some embodiments, prediction input GUI object 208c may include one or more text fields, number fields, menus, drop-down boxes, slider bars, check-boxes, toggle switches, or the like configured to allow a user to execute one or more inputs via interaction with GUI object 208c to specify the user's input for the upcoming round. In the example shown, GUI object 208c displays a prompt to the user prompting the user to make a certain prediction: "Over/under 1.5 three-point shots made during Round 2?" In some embodiments, a user may click or tap GUI object 208c to select options for responding to the prompt using a drop-down menu or toggle-switch. Once the user has made a prediction, the user's prediction may be displayed by GUI object 208c up until the beginning of the next upcoming round.

In some embodiments, when the current round ends and the next round begins, GUI 200 may be updated in accordance with whether a user's predictions for the current round were correct. For example, if a user's prediction for Round 1 was incorrect, then the user may be eliminated from the prediction game and GUI 200 may redirect a user to a home screen to provide the user the opportunities to enter a different game. In this case, stored data regarding the user's conditional prediction for Round 2 may be discarded by the system. On the other hand, if a user's prediction for Round 1 was correct, then the user may advance to Round 2, and GUI 200 may accordingly be updated to reflect that the user has advanced. Region 204 may be updated to reflect the new remaining number of players, region 206 may be updated to reflect information about Round 2 and the user's locked-in prediction for Round 2, and region 208 may be updated to reflect information about Round 3 and to solicit a conditional prediction for Round 3 in the event that the user advances past Round 2.

In some embodiments, time indicator 210 may be a region of GUI 200 configured to display information about a current time according to the time standard used for making predictions in the prediction game. For example, if rounds of the game are defined with respect to Eastern Standard Time, then the time indicator may display the current time in Eastern Standard Time. In some embodiments, if rounds of the game are defined with respect to an in-event game clock, then the time indicator may display an indication of time according to the in-event game-clock.

In some embodiments, video feed region 212 may be a region of GUI 200 configured to display a video feed of the live event about which predictions are being made. In some embodiments, the video feed displayed in region 212 may be "live" with no artificial delay introduced. In some embodiments, video feed region 212 may be synchronized with time indicator 210 such that time displayed on time indicator 210 reflects the time at which events transpiring in video feed region 212 actually took place. In some embodiments, the prediction game may use a rules convention such that the time that governs for assessing predictions is the time at which an in-event occurrence is broadcasted via region 212 in the platform of the game system, rather than the actual time at which the occurrence occurred in the physical works (e.g., this may introduce a very slight shift in the timing convention used for the prediction game as compared to the real-world time at which events occurred, but it may allow for users to immediately know when watching video feed region 212 the in-game "time" at which an event will be considered to have occurred.

Figure 3:
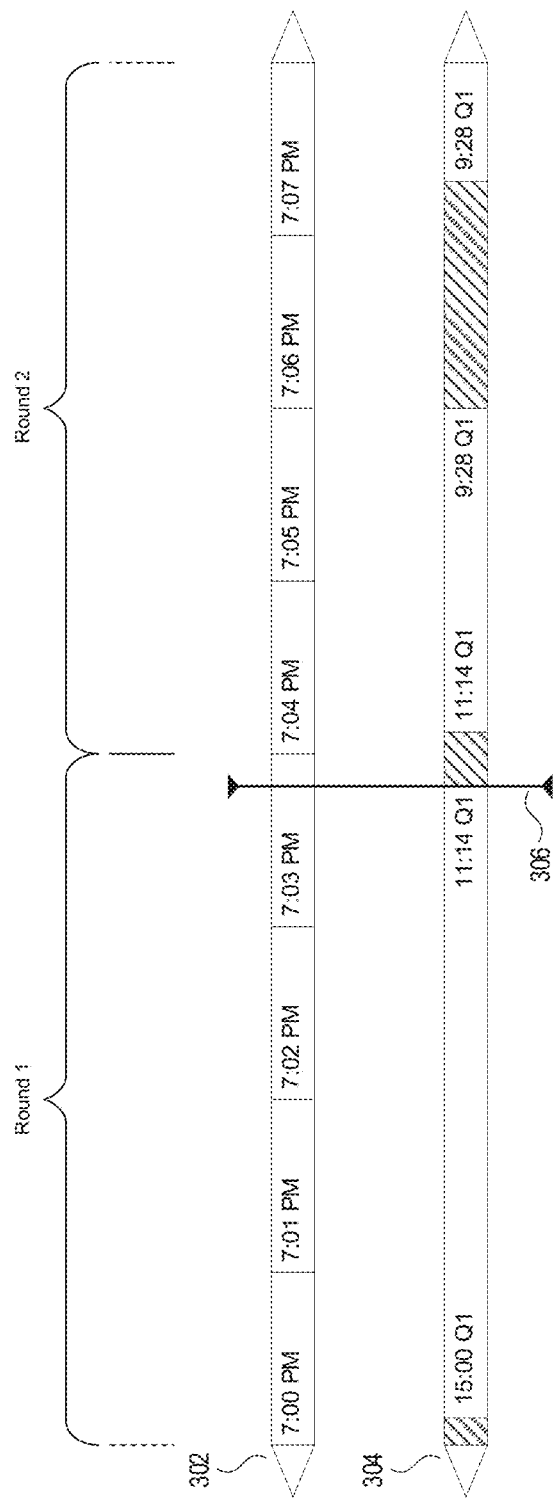
FIG. 3 shows a set of timing schemes for organizing data for use in a gaming system, in accordance with some embodiments.

FIG. 3 shows a set of two timing schemes for organizing data for use in a gaming system, in accordance with some embodiments. Specifically, timing scheme 302 is a timing scheme according to Eastern Standard Time, while timing scheme 304 is a timing scheme according to an in-event timing scheme according to a game clock of a basketball game.

As shown, timing scheme 302 marks time in a predictable periodic manner for eight minutes spanning Round 1 and Round 2 (four minutes each) of a prediction game. As shown by timing scheme 304, the in-event game-clock timing scheme is less predictable, less consistent, and less standardized. For example, while the game was scheduled to start at 7:00 ET, tipoff did not actually occur until about 15 seconds after 7:00:00 ET, at which point the game clock began counting down from 15:00 in the first quarter. As further shown by timing scheme 302, the in-event (e.g., game-clock) timing scheme may in some embodiments be intermittently paused, as shown in FIG. 3 by the hashed regions of timing scheme 304: at 11:14 remaining in the first quarter, there is a ~30-second stoppage of the game clock; at 11:14 remaining in the first quarter, there is a ~80-second stoppage of the game clock.

FIG. 3 further shows an in-game occurrence 306 that occurs at 11:14 remaining in the first quarter according to timing scheme 304. For example, a basket was made in the basketball game on which a foul was called, triggering the stoppage in the game clock shown following 11:14 Q1. As shown, while the occurrence happened at 11:14 Q1 according to timing scheme 304, it may be determined that the occurrence happened at 7:03:45 according to timing scheme 302.

Thus, in some embodiments, a system such as system 100 may receive event data from an event data source indicating the occurrence 306 occurred at 11:14 Q1 according to timing scheme 304. The system may then augment the event data to be associated with timing data indicating that the occurrence 306 occurred at 7:03:45 according to timing scheme 302. The augmented event data may then be stored for use in the system for determining whether one or more user predictions with respect to Round 1 of the prediction game were correct.

Figure 4:
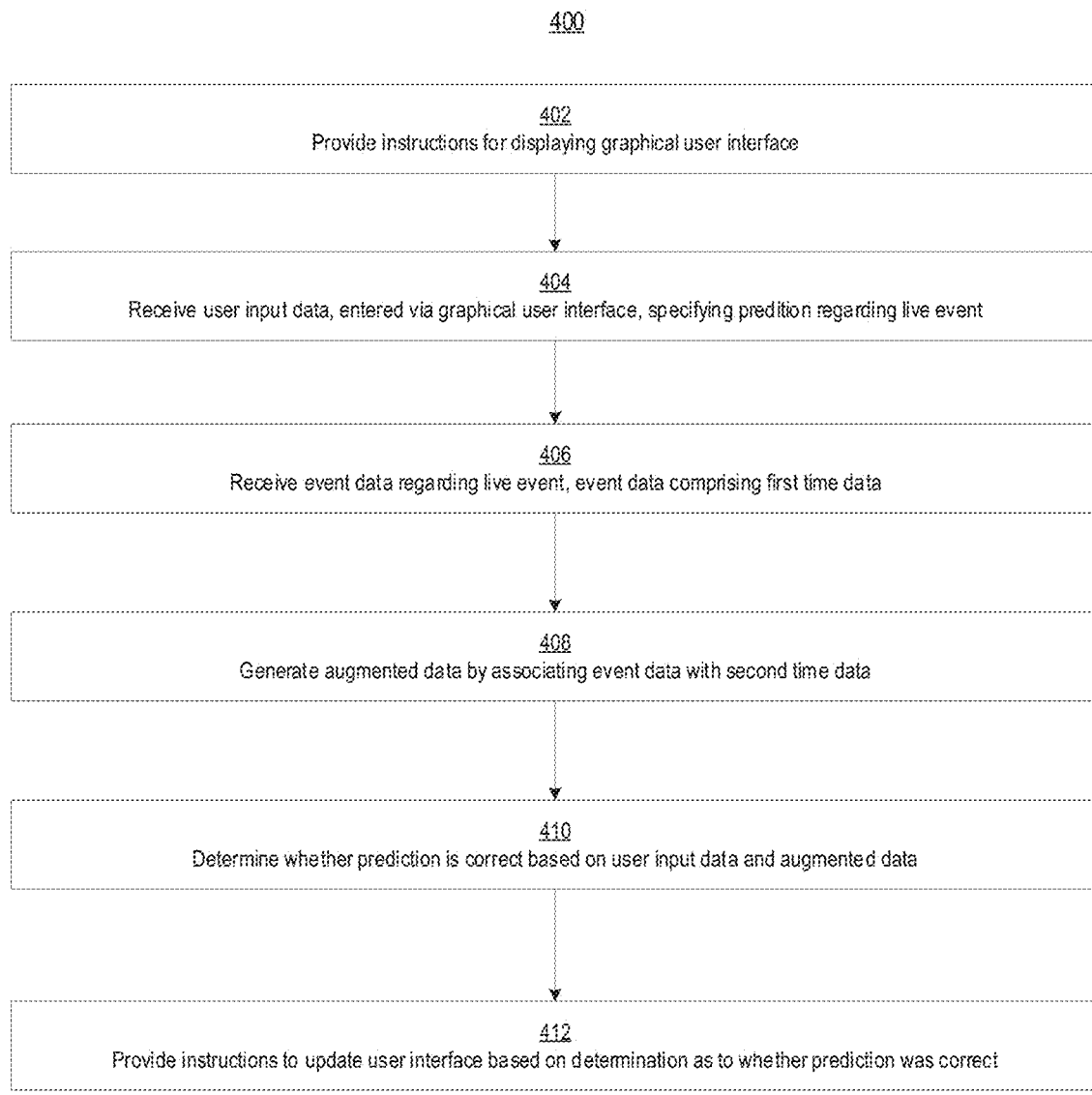
FIG. 4 shows a flow chart depicting a method for providing a gaming platform, in accordance with some embodiments.

FIG. 4 shows a flow chart depicting a method 400 for providing a gaming platform, in accordance with some embodiments. In some embodiments, method 400 may be performed in whole or in part by a system for providing a gaming platform, such as system 100 described above with reference to FIG. 100.

At block 402, in some embodiments, the system may provide instructions for displaying a graphical user interface. In some embodiments, the graphical user interface displayed may be any graphical user interface configured to accept user input data specifying one or more predictions regarding one or more live events. In some embodiments, the graphical user interface may display information regarding said one or more live events in real-time or near real-time. In some embodiments, the graphical user interface may be configured to allow end-users to participate in multi-round prediction game, such as a game in which participants are eliminated on a round-by-round basis if participants' predictions about outcomes of the live event are not correct. In some embodiments, the graphical user interface may be configured to allow users to make predictions regarding outcomes of sporting events, reality television events, tournaments, races, stock markers, trading markets, and/or any televised or broadcasted event.

In some embodiments, the graphical user interface may share any one or more features in common with graphical user interface 200 described above with reference to FIG. 2. In the example of system 100 of FIG. 1, serve 102 may provide the instructions to display the graphical user interface to any one (or more) of user devices 104*a*-104*d*.

At block 404, in some embodiments, the system may receive user input data, entered via the graphical user interface, specifying a prediction regarding a live event. For example, an end user of a user device on which the graphical user interface is displayed may execute one or more inputs that are detected by the user device, and the user device may responsively transmit a signal to the system (e.g., to server 102 in system 100) specifying the user input data received. The user input data may comprise a prediction regarding a future outcome of the live event, such as winning teams, points scored, in-game statistics recorded, and/or market activities, values, volumes, and/or trades. The user input data may further comprise time data specifying a window of time to which the user's prediction applies. In some embodiments, the end-user may manually specify the window of time for the prediction, while in other embodiments the graphical user interface may prompt the user to make a prediction regarding a predefined window in time and the prediction data transmitted from the user device to the system/server may automatically be configured to include time data specifying the predefined window in time.

As discussed above, in some embodiments, the user input data may specify a time window for the prediction data according to a predefined time standard. In some embodiments, the prediction data may include time data defined by a time standard an in-event timing convention (e.g., a game clock, such that a round of the prediction game or time window for a prediction could be defined with respect to a game-clock of a sports game), with respect to a time standard agnostic to in-event timing conventions (e.g., a coordinated universal time standard), or both.

At block 406, in some embodiments, the system may receive event data regarding a live event, the event data comprising first time data.

In some embodiments, event data may comprise information regarding outcomes of the live event—e.g., game, race, show, competition, market, etc.—about which one or more users have made predictions. The event data may specify winners, scores, statistics, values, or the like regarding the underlying live event about which predictions have been made.

Event data may comprise time data associated with the information regarding outcomes of the live event, wherein the time data may specify a time at which one or more of the outcomes indicated by the data occurred. In some embodiments, the time data included in the event data may be time data according to an in-event time standard such as a game-clock time standard and/or a designation of halves, quarters, periods, rounds, innings, heats, sets, games, matches, or the like.

In the example of system 100, server 102 may receive event data from an event data source such as event data source 106. In some embodiments, server 102 may automatically store the event data upon receipt and/or may automatically process the received event data, for example by augmenting the received event data as described below.

At block 408, in some embodiments, the system may generate augmented data by associating the event data with second time data. As stated above, the received event data may comprise first time data according to an in-event time standard such as a game-clock time standard. In some embodiments, the system (e.g., system 100 and/or server 102) may process the received event data in order to generate augmented data that specifies the in-event occurrence indicated by the received event data and indicates a time at which the occurrence occurred, wherein the augmented data indicates the time at which the occurrence occurred according to a second time standard different from the first time standard. In some embodiments, the second time standard may be a time standard that is agnostic to in-event timing conventions. For example, the second time standard may be a coordinated universal time standard (e.g., GMT, EST, etc.).

By generating augmented data that specifies the time at which in-event occurrences occurred according to a second time standard agnostic to in-event timing conventions, the system may be able to assess the accuracy of predictions that were made with respect to the second time standard. For example, the system may be able to assess whether a prediction that a player would score a touchdown before 8:00 EST was correct. This may increase the predictability and reliability of timing of prediction games, such that users may know exactly what time rounds will end and when predictions may be assessed. Furthermore, this may facilitate users making (and the system assessing) inter-event predictions, for example predicting that one sporting event will end before another sporting event, or that points will be scored in one sporting event before points are scored in another sporting event; these inter-event predictions may be assessed by the system with respect to the augmented data for each event indicating when (e.g., in coordinated universal time) respective events in each sporting event occurred.

At block 410, in some embodiments, the system may determine whether the prediction is correct based on the user input data and the augmented data. For example, the system may compare (a) the user input data predicting an in-event occurrence and associated time data for said predicted in-event occurrence to (b) the augmented event data specifying in-event occurrences and time data for said in-event occurrences. The comparison may be made by comparing time data in the prediction data and time data in the event data. The compared time data may each be according to the same time standard, which may for example be the second time standard (e.g., coordinated universal time) that is agnostic to in-event timing conventions.

In the example of system 100, server 102 may determine whether a user's prediction was correct and may store (locally or remotely) an indication of whether the prediction was correct. The system may automatically transmit one or more indications of whether the prediction was correct.

At block 412, in some embodiments, the system may provide instructions to update the user interface based on the determination as to whether the prediction was correct. In some embodiments, automatically in response to determining whether a user's prediction was correct, the system (e.g., server 102) may transmit instructions to a user device associated with the prediction (e.g., a user device from which data indicating the prediction was received) to updated the graphical user interface displayed on the user device.

In some embodiments, the graphical user interface may be updated to display an indication (e.g., textual or graphical) indicating whether the user's prediction was correct. In some embodiments, the graphical user interface may be updated, in accordance with a determination that the user's prediction was correct, to display a graphical user interface screen associated with a subsequent round of a prediction game to which the user has advanced (or to which the user has conditionally advanced) in accordance with the user's prediction being correct. In some embodiments, the graphical user interface may be updated, in accordance with a determination that the user's prediction was correct, to cease display of a graphical user interface screen associated with one or more rounds of a prediction game in accordance with the user's prediction being incorrect and the user being eliminated from the prediction game.

Figure 5:
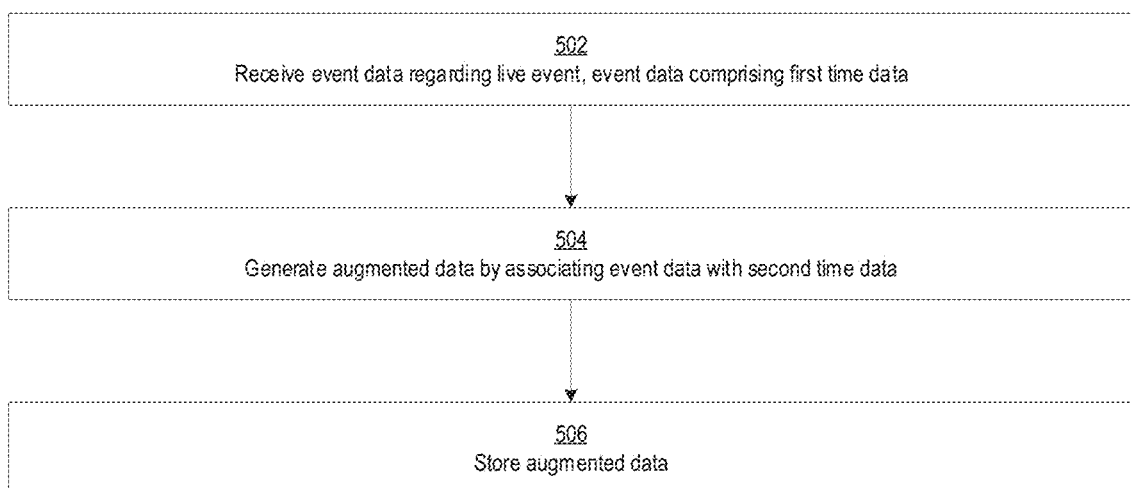
FIG. 5 shows a flow chart depicting a method for receiving and augmenting live event data, in accordance with some embodiments.

FIG. 5 shows a flow chart depicting a method 500 for receiving and augmenting live event data, in accordance with some embodiments. In some embodiments, method 500 may be performed in whole or in part by a system for providing a gaming platform, such as system 100 described above with reference to FIG. 100.

At block 502, in some embodiments, the system may receive event data regarding a live event, the event data comprising first time data.

In some embodiments, event data may comprise information regarding outcomes of the live event—e.g., game, race, show, competition, market, etc.—about which one or more users have made predictions. The event data may specify winners, scores, statistics, values, or the like regarding the underlying live event about which predictions have been made.

Event data may comprise time data associated with the information regarding outcomes of the live event, wherein the time data may specify a time at which one or more of the outcomes indicated by the data occurred. In some embodiments, the time data included in the event data may be time data according to an in-event time standard such as a game-clock time standard and/or a designation of halves, quarters, periods, rounds, innings, heats, sets, games, matches, or the like.

In the example of system 100, server 102 may receive event data from an event data source such as event data source 106. In some embodiments, server 102 may automatically store the event data upon receipt and/or may automatically process the received event data, for example by augmenting the received event data as described below.

At block 502, in some embodiments, the system may generate augmented data by associating the event data with second time data. As stated above, the received event data may comprise first time data according to an in-event time standard such as a game-clock time standard. In some embodiments, the system (e.g., system 100 and/or server 102) may process the received event data in order to generate augmented data that specifies the in-event occurrence indicated by the received event data and indicates a time at which the occurrence occurred, wherein the augmented data indicates the time at which the occurrence occurred according to a second time standard different from the first time standard. In some embodiments, the second time standard may be a time standard that is agnostic to in-event timing conventions. For example, the second time standard may be a coordinated universal time standard (e.g., GMT, EST, etc.).

By generating augmented data that specifies the time at which in-event occurrences occurred according to a second time standard agnostic to in-event timing conventions, the system may be able to assess the accuracy of predictions that were made with respect to the second time standard. For example, the system may be able to assess whether a prediction that a player would score a touchdown before 8:00 EST was correct. This may increase the predictability and reliability of timing of prediction games, such that users may know exactly what time rounds will end and when predictions may be assessed. Furthermore, this may facilitate users making (and the system assessing) inter-event predictions, for example predicting that one sporting event will end before another sporting event, or that points will be scored in one sporting event before points are scored in another sporting event; these inter-event predictions may be assessed by the system with respect to the augmented data for each event indicating when (e.g., in coordinated universal time) respective events in each sporting event occurred.

At block 506, in some embodiments, the system may store the augmented data. In some embodiments, the system may store the augmented data locally and/or remotely. In some embodiments, the system may store the augmented data in association with the original (e.g., raw) event data. In some embodiments, the system may store the augmented data in association with metadata indicating the first time standard and/or the second time standard. In some embodiments, the system may store the augmented data in a database. In some embodiments, the system may store the augmented data in a database or other data store that is organized in accordance with the second time standard; in this way, the system may be able to more rapidly look up stored data according to a point in time or a time window according to the second time standard.

Figure 6:
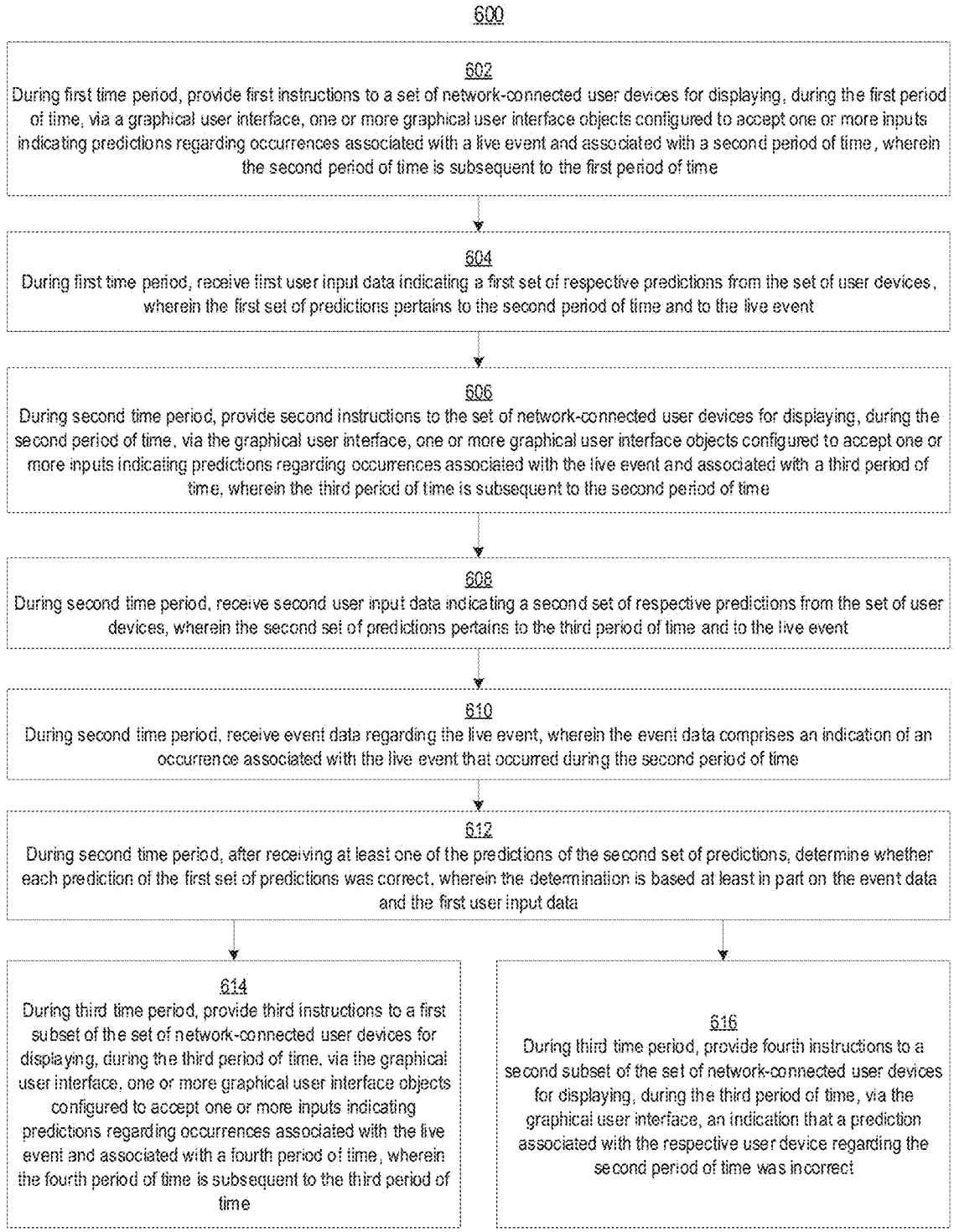
FIG. 6 shows a flow chart depicting a method for providing a gaming platform, in accordance with some embodiments.

FIG. 6 shows a flow chart depicting a method 600 for providing a gaming platform, in accordance with some embodiments. In some embodiments, method 600 may be performed in whole or in part by a system for providing a gaming platform, such as system 100 described above with reference to FIG. 100.

The steps of method 600 below are set forth with respect to a first time period, a second time period, and a third time period. In some embodiments, the time periods referenced in describing method 600 may be time periods that define subsequent rounds of a multi-round multiplayer prediction game in which users are eliminated from the game after a round in which they make an incorrect prediction. In some embodiments, the time periods may directly abut one another such that a subsequent round may begin immediately as a current round ends. In some embodiments, users may execute user inputs to indicate their predictions for a subsequent round before the current round ends, and only those users who advance to the subsequent round may remain in the game for that subsequent round may have their predictions for that subsequent round assessed by the system. In some embodiments, users may be able to make predictions for a subsequent round only during the time period defined by a current round. In some embodiments, a time period in which predictions for a future round can be made may be defined separately from the time bounds of a current round.

In some embodiments, the time constraints for making predictions and/or the time constraints about which in-event predictions are made may be defined with respect to a universal time standard or system time standard that is agnostic to timing conventions of the underlying live event. Thus in some embodiments, the time periods discussed with respect to method 600 may be defined with respect to a coordinated time standard agnostic to in-event (e.g., game-clock) timing conventions.

At block 602, in some embodiments, during a first period of time, the system may provide first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time. In some embodiments, the graphical user interface may share one or more features in common with graphical user interface 200 described above with respect to FIG. 2. In the example of system 100, server 102 may provide instructions to user devices 104a-104d such that each of the user devices may display graphical user interface 200.

At block 604, in some embodiments, during the first period of time, the system may receive first user input data indicating a first set of respective predictions from the set of user devices, wherein the first set of predictions pertains to the second period of time and to the live event. For example, an end user each user device in the set of user devices may execute one or more respective inputs that are detected by the respective user devices, and the user devices may responsively transmit a signal to the system (e.g., to server 102 in system 100) specifying the user input data received. The respective user input data for each user device may comprise respective predictions, as discussed above, regarding future outcomes of the live event. As discussed above, the user input data may further comprise respective time data specifying a window of time to which the respective user's prediction applies.

At block 606, in some embodiments, during the second period of time, the system may provide second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time. In some embodiments, the system (e.g., server 102) may transmit instructions to the user devices to update the graphical user interface to advance from a first round of the prediction game to a next round of the prediction game. During the next round of the prediction game, the system may accept inputs regarding predictions for a future time period, e.g., third "third" period of time.

At block 608, in some embodiments, during the second period of time, the system may receive second user input data indicating a second set of respective predictions from the set of user devices, wherein the second set of predictions pertains to the third period of time and to the live event. In some embodiments, all of the users in the set of users discussed above with respect to block 604 may be able to submit predictions for the third period of time, as none of the users in that set of users may yet have been eliminated from contention in the game.

At block 610, in some embodiments, during the second period of time, the system may receive event data regarding the live event, wherein the event data comprises an indication of an occurrence associated with the live event during the first period of time. In some embodiments, the event data may comprise information regarding outcomes of the live event—e.g., game, race, show, competition, market, etc.—about which the set of users have made predictions. The event data may specify winners, scores, statistics, values, or the like regarding the underlying live event about which predictions have been made. In the example of system 100, server 102 may receive event data from an event data source such as event data source 106.

At block 612, in some embodiments, during the second period of time, the system may, after receiving at least one of the predictions of the second set of predictions, determine whether each prediction of the first set of predictions was correct, wherein the determination is based at least in part on the event data and the first user input data. In some embodiments, the system may compare prediction data submitted by each of the user devices to the event data received in order to determine whether each user's respective prediction was correct. This determination may be used to determine whether to eliminate each user from contention in the multi-round game, and may be used to determine whether it is necessary to keep in storage and evaluate a previously-submitted prediction from a user. Previously-submitted predictions for future time-periods may be discarded if it is determined that the user is eliminated, and may be retained if it is determined that the user is not eliminated.

At blocks 614 and 616, as described below, the user interfaces of respective user devices may be updated in accordance with whether each respective user has been eliminated or not. For users that have not been eliminated, their respective user interfaces may be updated to display GUI objects for inputting predictions about a next period of time (e.g., a "fourth" period of time). For users that have been eliminated, their respective user interfaces may be updated not to display GUI objects for inputting predictions about a next period of time (e.g., a "fourth" period of time); for users that have been eliminated, their respective user interfaces may be updated not to display an indication that they have been eliminated from contention in the multi-round prediction game.

At block 614, in some embodiments, during the third period of time, the system may provide third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

At block 616, in some embodiments, during the third period of time, the system may provide fourth instructions to a second subset of the set of network-connected user devices for displaying, during the third period of time, via the graphical user interface, an indication that a prediction associated with the respective user device regarding the second period of time was incorrect.

Figure 7:
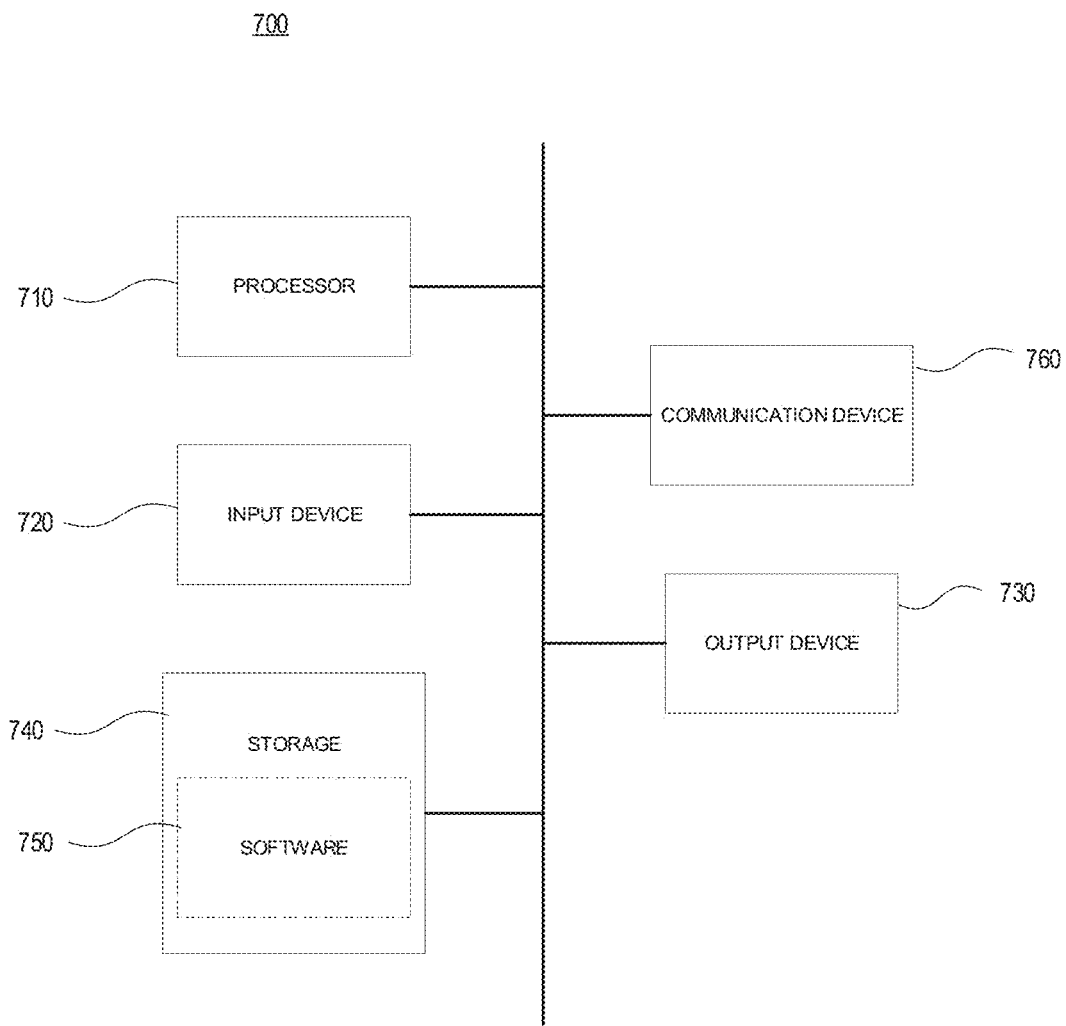
FIG. 7 shows a computer, in accordance with some embodiments.

FIG. 7 shows a computer in accordance with one embodiment. Computer 700 can be a component of a mobile electronic device, flag football down marker, electronic flag football flag and/or belt, smart football, and/or any associated electronic device or system, such as a mobile electronic device 104, flag belt set 106, football 108, marker 110, mobile electronic device 112, remote server 114, and/or electronic device 200. In some embodiments, computer 700 is configured to execute a method for providing a game platform and/or processing data for use in a game platform as described herein.

Computer 700 can be a host computer connected to a network. Computer 700 can be a client computer or a server. As shown in FIG. 7, computer 700 can be any suitable type of microprocessor-based device, such as a personal computer, workstation, server, or handheld computing device, such as a phone or tablet. The computer can include, for example, one or more of processor 710, input device 720, output device 730, storage 740, and communication device 760.

Input device 720 can be any suitable device that provides input, such as a touch screen or monitor, keyboard, mouse, or voice-recognition device. Output device 730 can be any suitable device that provides output, such as a touch screen, monitor, printer, disk drive, or speaker.

Storage 740 can be any suitable device that provides storage, such as an electrical, magnetic, or optical memory, including a RAM, cache, hard drive, CD-ROM drive, tape drive, or removable storage disk. Communication device 760 can include any suitable device capable of transmitting and receiving signals over a network, such as a network interface chip or card. The components of the computer can be connected in any suitable manner, such as via a physical bus or wirelessly. Storage 740 can be a non-transitory computer-readable storage medium comprising one or more programs, which, when executed by one or more processors, such as processor 710, cause the one or more processors to execute methods and/or techniques described herein.

Software 750, which can be stored in storage 740 and executed by processor 710, can include, for example, the programming that embodies the functionality of the present disclosure (e.g., as embodied in the systems, computers, servers, and/or devices as described above). In some embodiments, software 750 can include a combination of servers such as application servers and database servers.

Software 750 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. The illustrative embodiments described above, however, are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A network-enabled gaming system comprising one or more processors configured to:
provide first instructions to a network-connected user device for displaying a graphical user interface on a display of the mobile electronic device, wherein the graphical user interface comprises a first user interface object configured to accept one or more inputs indicating predictions regarding live events;
receive, from the user device, user input data specifying a prediction regarding a live event;
receive event data regarding the live event, wherein the event data comprises at least one predetermined statistic and first time data indicating a time, according to a live-event time-standard, at which an occurrence associated with the live event occurred;

generate augmented data by associating the event data with second time data, wherein the second time-data indicates the point in time, according to a second time-standard different from the live-event time-standard, at which the occurrence associated with the live event occurred;

determine whether the prediction is correct based at least in part on the user input data and the augmented data comprising the second time data; and provide second instructions to the user device for updating the graphical user interface in accordance with the determination as to whether the prediction was correct, wherein updating the user graphical interface comprises displaying an indication indicating whether the prediction was correct.

2. The system of claim 1, wherein the prediction regarding a live event comprises a prediction as to whether the occurrence will occur during a predetermined chronological portion of the live event, wherein the predetermined chronological portion of the live event is defined with respect to the second time standard.

3. The system of claim 1, wherein displaying the indication indicating whether the prediction was correct comprises, in accordance with a determination that the prediction was correct, displaying a second user interface object configured to accept one or more inputs indicating predictions regarding live events, wherein:

the first user interface object is configured to accept one or more predictions regarding a first chronological portion of the live event; and the second user interface object is configured to accept inputs pertaining to a second chronological portion of the live event, wherein the second chronological portion is subsequent to the first chronological portion.

4. The system of claim 3, wherein displaying the indication indicating whether the prediction was correct comprises, in accordance with determining that the prediction was not correct, not displaying the second user interface object.

5. The system of claim 1, wherein displaying the indication indicating whether the prediction was correct comprises, in accordance with a determination that the prediction was not correct, displaying an indication that a user has been eliminated from contention in a multi-round game.

6. The system of claim 1, wherein the live event comprises a sporting event, and the occurrence associated with the live event comprises a statistic being performed by a participant in the sporting event.

7. The system of claim 1, wherein displaying the graphical user interface comprises displaying a video feed of the live event.

8. The system of claim 7, wherein the occurrence associated with the live event comprises broadcasting, via the video feed, of an in-event occurrence of the live event.

9. The system of claim 1, wherein displaying the graphical user interface comprises displaying a live indication of the second time-standard.

10. The system of claim 1, wherein the second time-standard different from the live-event time-standard comprises a time standard selected from: UT0, UT1, UT1R, UT2, and UTC.

11. The system of claim 1, wherein displaying an indication indicating whether the prediction was correct comprises, in accordance with a determination that the prediction was correct, displaying a second user interface object configured to accept one or more inputs indicating predictions regarding live events.

12. A non-transitory computer-readable storage medium storing instructions that, when executed by one or more processors of a network-enabled gaming system, cause the system to:

provide first instructions to a network-connected user device for displaying a graphical user interface on a display of the mobile electronic device, wherein the graphical user interface comprises a first user interface object configured to accept one or more inputs indicating predictions regarding live events;

receive, from the user device, user input data specifying a prediction regarding a live event;

receive event data regarding the live event, wherein the event data comprises at least one predetermined statistic and first time data indicating a time, according to a live-event time-standard, at which an occurrence associated with the live event occurred;

generate augmented data by associating the event data with second time data, wherein the second time-data indicates the point in time, according to a second time-standard different from the live-event time-standard, at which the occurrence associated with the live event occurred;

determine whether the prediction is correct based at least in part on the user input data and the augmented data comprising the second time data; and provide second instructions to the user device for updating the graphical user interface in accordance with the determination as to whether the prediction was correct, wherein updating the user graphical interface comprises displaying an indication indicating whether the prediction was correct.

13. A method, performed by one or more processors of a network-enabled gaming system, the method comprising:

providing first instructions to a network-connected user device for displaying a graphical user interface on a display of the mobile electronic device, wherein the graphical user interface comprises a first user interface object configured to accept one or more inputs indicating predictions regarding live events;

receiving, from the user device, user input data specifying a prediction regarding a live event;

receiving event data regarding the live event, wherein the event data comprises at least one predetermined statistic and first time data indicating a time, according to a live-event time-standard, at which an occurrence associated with the live event occurred;

generating augmented data by associating the event data with second time data, wherein the second time-data indicates the point in time, according to a second time-standard different from the live-event time-standard, at which the occurrence associated with the live event occurred;

determining whether the prediction is correct based at least in part on the user input data and the augmented data comprising the second time data; and providing second instructions to the user device for updating the graphical user interface in accordance with the determination as to whether the prediction was correct, wherein updating the user graphical interface comprises displaying an indication indicating whether the prediction was correct.

14. A data ingestion system for receiving and augmenting live event data, the system comprising one or more processors configured to:
- receive event data regarding a live event, wherein the event data comprises at least one predetermined statistic and first time data indicating a time, according to a live-event time-standard, at which an occurrence associated with the live event occurred;
- generate augmented data by associating the input data with second time data, wherein the second time-data indicates the point in time, according to a second time-standard different from the live-event time-standard, at which the occurrence associated with the live event occurred; and
- store the augmented data comprising the second time data in a database.

15. The system of claim 14, wherein the live event comprises a sporting event, and the occurrence associated with the live event comprises a statistic being performed by a participant in the sporting event.

16. The system of claim 14, wherein the occurrence associated with the live event comprises broadcasting of an in-event occurrence of the live event.

17. The system of claim 14, wherein the second time-standard different from the live-event time-standard comprises a time standard selected from: UT0, UT1, UT1R, UT2, and UTC.

18. A non-transitory computer-readable storage medium storing instructions that, when executed by one or more processors of a data ingestion system for receiving and augmenting live event data, cause the system to:
- receive event data regarding a live event, wherein the event data comprises at least one predetermined statistic and first time data indicating a time, according to a live-event time-standard, at which an occurrence associated with the live event occurred;
- generate augmented data by associating the input data with second time data, wherein the second time-data indicates the point in time, according to a second time-standard different from the live-event time-standard, at which the occurrence associated with the live event occurred; and
- store the augmented data comprising the second time data in a database.

19. A method, performed by data ingestion system for receiving and augmenting live event data, the method comprising:
- receiving event data regarding a live event, wherein the event data comprises at least one predetermined statistic and first time data indicating a time, according to a live-event time-standard, at which an occurrence associated with the live event occurred;
- generating augmented data by associating the input data with second time data, wherein the second time-data indicates the point in time, according to a second time-standard different from the live-event time-standard, at which the occurrence associated with the live event occurred; and
- storing the augmented data comprising the second time data in a database.

20. A network-enabled gaming system comprising one or more processors configured to:
- during a first period of time:
  - provide first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and
  - receive first user input data indicating a first set of respective predictions from the set of user devices, wherein the first set of predictions pertains to the second period of time and to the live event;
- during the second period of time:
  - provide second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time;
  - receive second user input data indicating a second set of respective predictions from the set of user devices, wherein the second set of predictions pertains to the third period of time and to the live event;
  - receive event data regarding the live event, wherein the event data comprises at least one predetermined statistic and an indication of an occurrence associated with the live event that occurred during the second period of time; and
  - after receiving at least one of the predictions of the second set of predictions, determine whether each prediction of the first set of predictions was correct, wherein the determination is based at least in part on the event data and the first user input data; and
- during the third period of time:
  - provide third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

21. The system of claim 20, wherein the first subset comprises user devices of the set of user devices for which a respective prediction from the first set of predictions was determined to be correct.

22. The system of claim 20, wherein the one or more processors are further configured to, during the third period of time, provide fourth instructions to a second subset of the set of network-connected user devices for displaying, during the third period of time, via the graphical user interface, an indication that a prediction associated with the respective user device regarding the second period of time was incorrect.

23. The system of claim 22, wherein the second subset comprises user devices of the set of user devices for which a respective prediction from the first set of predictions was determined to be incorrect.

24. The system of claim 20, wherein the second period of time is defined with respect to a time standard selected from: UT0, UT1, UT1R, UT2, and UTC.

25. The system of claim 20, wherein:
- the event data comprises first time data defined with respect to a game clock-live-event time standard associated with the live event; and determining whether each prediction of the first set of predictions was correct comprises augmenting the event data with second time data defined with respect to a second time standard different from the live-event time-standard.

26. A non-transitory computer-readable storage medium storing instructions that, when executed by one or more processors of a network-enabled gaming system, cause the system to:
during a first period of time:
provide first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and
receive first user input data indicating a first set of respective predictions from the set of user devices, wherein the first set of predictions pertains to the second period of time and to the live event;
during the second period of time:
provide second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time;
receive second user input data indicating a second set of respective predictions from the set of user devices, wherein the second set of predictions pertains to the third period of time and to the live event;
receive event data regarding the live event, wherein the event data comprises at least one predetermined statistic and an indication of an occurrence associated with the live event that occurred during the second period of time; and
after receiving at least one of the predictions of the second set of predictions, determine whether each prediction of the first set of predictions was correct, wherein the determination is based at least in part on the event data and the first user input data; and
during the third period of time:
provide third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

27. A method, performed by a network-enabled gaming system comprising one or more processors, the method comprising:
during a first period of time:
providing first instructions to a set of network-connected user devices for displaying, during the first period of time, via a graphical user interface, one or more graphical user interface objects configured to accept one or more inputs indicating predictions regarding occurrences associated with a live event and associated with a second period of time, wherein the second period of time is subsequent to the first period of time; and
receiving first user input data indicating a first set of respective predictions from the set of user devices, wherein the first set of predictions pertains to the second period of time and to the live event;
during the second period of time:
providing second instructions to the set of network-connected user devices for displaying, during the second period of time, via the graphical user interface, one or more graphical user interface objects configured to accept one or more inputs indicating predictions regarding occurrences associated with the live event and associated with a third period of time, wherein the third period of time is subsequent to the second period of time;
receiving second user input data indicating a second set of respective predictions from the set of user devices, wherein the second set of predictions pertains to the third period of time and to the live event;
receiving event data regarding the live event, wherein the event data comprises at least one predetermined statistic and an indication of an occurrence associated with the live event that occurred during the second period of time; and
after receiving at least one of the predictions of the second set of predictions, determining whether each prediction of the first set of predictions was correct, wherein the determination is based at least in part on the event data and the first user input data; and
during the third period of time:
providing third instructions to a first subset of the set of network-connected user devices for displaying, during the third period of time, via the graphical user interface, one or more graphical user interface objects configured to accept one or more inputs indicating predictions regarding occurrences associated with the live event and associated with a fourth period of time, wherein the fourth period of time is subsequent to the third period of time.

* * * * *

UNITED STATES PATENT AND TRADEMARK OFFICE
CERTIFICATE OF CORRECTION

PATENT NO. : 12,145,063 B2  
APPLICATION NO. : 17/456093  
DATED : November 19, 2024  
INVENTOR(S) : Jeffrey Lewis Page 1 of 1

It is certified that error appears in the above-identified patent and that said Letters Patent is hereby corrected as shown below:

In the Claims

At Column 22, Claim 1, Line 60, please delete "mobile electronic device" and insert --user device--

At Column 24, Claim 12, Line 10, please delete "mobile electronic device" and insert --user device--

At Column 24, Claim 13, Line 41, please delete "mobile electronic device" and insert --user device--

Signed and Sealed this  
Fourth Day of March, 2025

Coke Morgan Stewart  
*Acting Director of the United States Patent and Trademark Office*